(No Model.) 2 Sheets—Sheet 1.
C. A. & H. A. LOW & A. M. MESSENGER.
CORN HARVESTER.

No. 534,898. Patented Feb. 26, 1895.

WITNESSES:
Chas. Niola
Fredk Acker

INVENTORS
C. A. Low
H. A. Low
A. M. Messenger
BY
Munn & Co
ATTORNEYS.

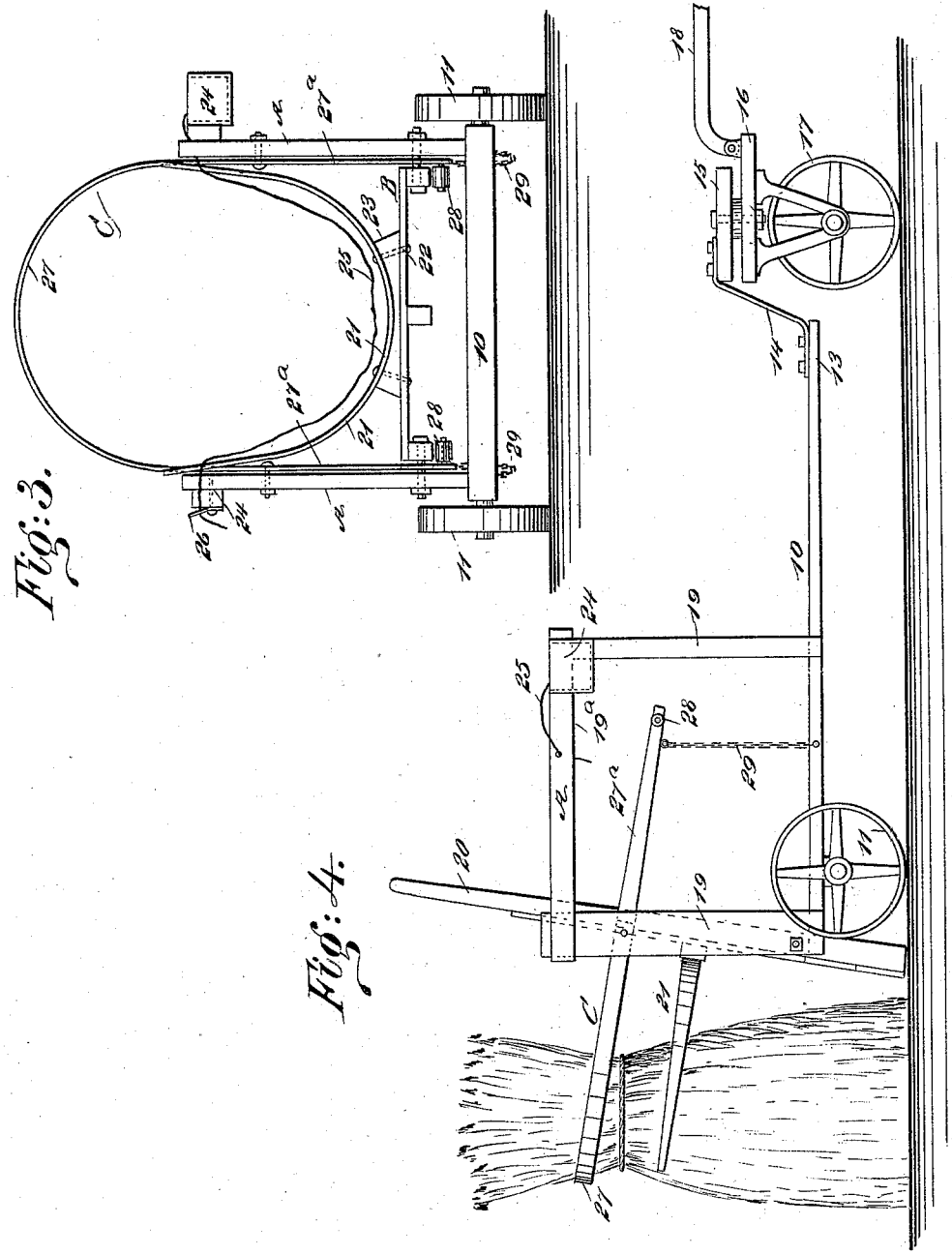

UNITED STATES PATENT OFFICE.

CHARLES A. LOW, HAROLD A. LOW, AND ALBERT M. MESSENGER, OF LAKE VIEW, IOWA.

CORN-HARVESTER.

SPECIFICATION forming part of Letters Patent No. 534,898, dated February 26, 1895.

Application filed November 17, 1894. Serial No. 529,147. (No model.)

*To all whom it may concern:*

Be it known that we, CHARLES A. LOW, HAROLD A. LOW, and ALBERT M. MESSENGER, of Lake View, in the county of Sac and State of Iowa, have invented a new and Improved Corn-Harvester, of which the following is a full, clear, and exact description.

Our invention relates to an improvement in corn harvesters, and it has for its object to so construct the harvester that the cut stalks may be placed in such a position upon the machine as to render them safe from the liability of being blown away, and whereby when a sufficient number of stalks have accummulated to form a shock the said shock may be expeditiously and conveniently shaped and tied, and said shock dumped from the machine in such a manner as to leave it in an upright position upon the ground.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
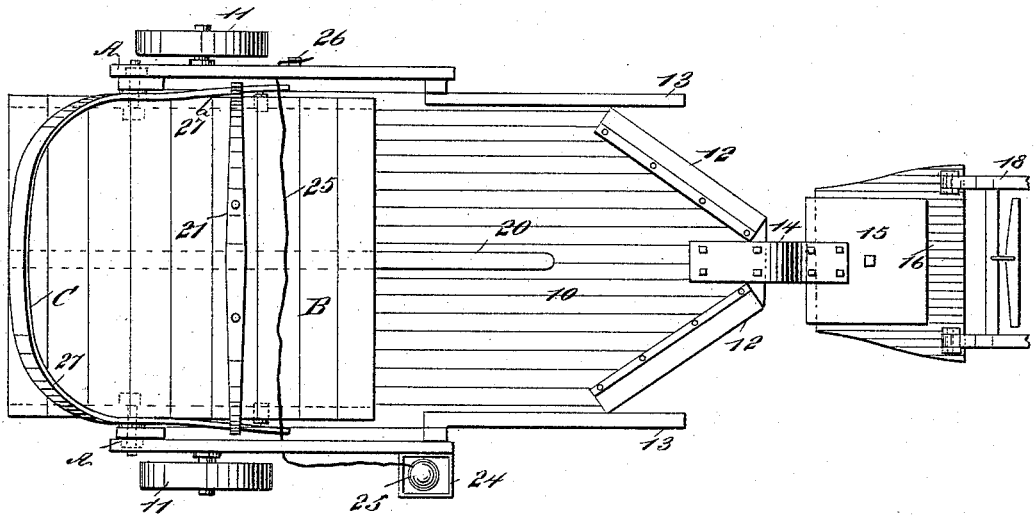
Figure 2:
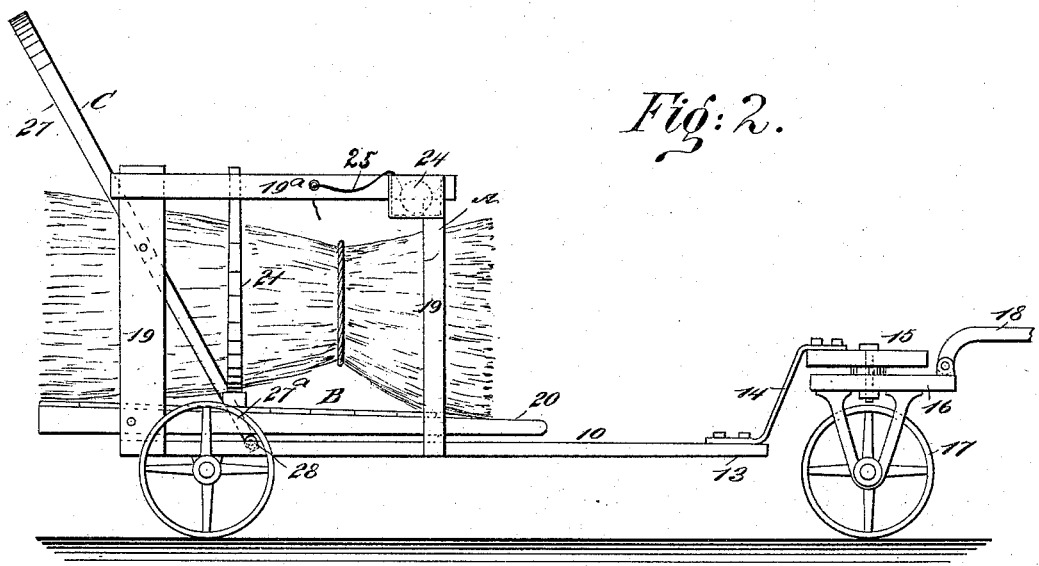

Figure 1 is a plan view of the machine. Fig. 2 is a side elevation of the same. Fig. 3 is a rear elevation of the machine; and Fig. 4 is a side elevation, illustrating the cradle in dumping position and the manner in which the shock is to be delivered therefrom.

In carrying out the invention a platform 10, of any desired length and width, is supported upon two wheels 11, mounted upon a suitable axle located at or near the rear of the platform. The front portion of the platform is beveled in opposite directions at its sides, as shown in Fig. 1, and upon the beveled surfaces knives 12 are secured in any approved manner, adapted to cut stalks of corn, and suitable guards 13 may be, and preferably are, located at the rear outer edges of the knives. An upwardly arched connecting bar 14, is secured to the platform about centrally between the knives 12, and this connecting bar, at its upper end, is secured to a smaller platform 15, mounted upon a truck 16 provided with a single wheel 17, the truck having swivel connection with the platform; and the shafts 18 are attached to said truck. We desire it, however, to be distinctly understood, that we do not claim anything as novel in the construction of the vehicle proper, or the connecting devices employed.

At the rear of the platform 10, upon each side, a railing A is formed, which preferably consists of two uprights 19 and an upper cross bar 19ª. An important feature of the invention consists in the location upon the platform 10, between the side railings A, of a dumping platform or cradle B, fulcrumed between its center and rear end upon the rear standards or uprights 19 of the said railings. Consequently a comparatively short portion of the cradle or dumping platform extends rearwardly beyond the main platform, and this cradle is raised or lowered through the medium of a handle 20 attached centrally thereto and extending beyond its forward end; but the said handle may be replaced by other or equivalent mechanism.

A flexible shaping strap 21 is secured upon the dumping platform or cradle near the center, the strap being transversely located; and the ends thereof are made to extend upward, imparting to it a substantially U-shape, as shown in Fig. 3. This strap may be of a material such as spring metal, but it may be of any other suitable material, and usually it is secured to the platform through the medium of bolts 22, passing through a bed block 23 intervening it and the platform.

At the upper portion of one of the railings a box 24 is secured in any approved manner, adapted to contain, for example, a ball of twine or a spool of wire 25, which is utilized for tying the shock after it has been squeezed together or brought into proper shape by the binding or shaping strap 21. Upon the railing opposite to that to which the box 24 is attached a catch 26 is located, adapted to receive and hold the free end of the wire or cord 25.

A guide yoke C is employed in connection with the dumping platform or cradle B, and this guide yoke consists of an upper bow section 27 and shank sections 27ª, the bow section being pivotally attached to the rear standards of the rails A, while the shank sections 27ª extend downward to the cradle and said shank sections at their lower ends are provided with friction rollers 28, the said rollers being adapted, when the platform is in its receiving position, to engage with the under faces of the side beams thereof, as is shown in Figs. 2 and 3. A chain 29, or the equivalent thereof is attached to the lower ends of the shanks and to the main platform 10 of the vehicle. The guide yoke stands at an angle to the railings, as shown in Fig. 2, its upper or bow section having an upward and rearward inclination, while its shank sections 27ª have a downward and a forward inclination.

In the operation of this machine the dumping platform or cradle is brought to the horizontal position, and the tie wire or cord is carried across the said cradle and its free end is attached to the catch 26, a sufficient length of the cord or wire being removed from the box to produce a loop, as shown in Fig. 3. The animal drawing the machine is now directed between two rows of standing corn, and the stalks will be caught by the knives 12 and will be received by a person or persons standing on the platform 10, and by said person laid with their butts rearward upon the dumping platform or cradle within the shaping strap 21, and consequently upon the tie wire or cord 25. When a sufficient quantity of stalks has been cut to form a shock, the shaping strap may be drawn closely around the mass of stalks, and the tying cord or wire is then likewise drawn around the shock and the ends fastened together. If in practice it is found desirable the shaping strap 21 need be employed only to impart to the shock the proper rounded form while the stalks are being fed therein.

A shock having been formed and tied upon the dumping platform or cradle, the latter is elevated by the attendant, as shown in Fig. 4, whereupon the shock will slip from the cradle, being guided by the strap 21, and will stand upon the ground in an upright position, the butts of the stalks resting upon the ground; and as the platform or cradle is carried to its dumping position, the roller ends of the guide yoke are released from engagement with the cradle, and the yoke will gravitate to a substantially horizontal position, its bow portion surrounding the upper portion of the shock, as is likewise shown in Fig. 4, preventing the shock from overturning, the downward movement of the guide yoke being limited by the retaining chain 29. As the machine is drawn forward after dumping the shock, and the cradle is restored to its normal or horizontal position, the guide yoke will slip from over the shock and its rollers 28 will again engage with the cradle, and as the cradle assumes its normal position it will compel the yoke to do likewise, the rollers 28 traveling along the under face of the cradle. In this manner the field of corn may be expeditiously and conveniently harvested.

Having thus described our invention, we claim as new and desire to secure by Letters Patent—

1. In a corn harvester, the combination, with the harvester platform, of the pivoted shock-receiving platform constructed to dump the shock at its rear end, and the pivoted guide yoke for holding the shock in an upright position after it is dumped, substantially as described.

2. The combination of the harvester platform, the pivoted shock-receiving and dumping platform, the pivoted guide yoke for holding the shock in an upright position after it is dumped, and a connection between the pivoted platform and the guide yoke whereby they will both swing upon their pivots when the shock is dumped, substantially as described.

3. In a corn harvester, the combination, with a harvester platform and standards projected therefrom, of a cradle pivoted upon the said harvester platform, adapted to receive the cut stalks of corn, and a guide yoke pivoted upon the said standards and having one of its ends carried forwardly and provided with a friction roller adapted for engagement with the cradle, as and for the purpose set forth.

4. In a corn harvester, the combination, with the harvester platform and standards secured thereto, of a cradle pivoted between the standards, adapted to receive the cut stalks of corn and provided with a shaping strap or strip, and a guide yoke pivoted to the standards above the cradle, one end of the guide yoke being extended downwardly and provided with a friction roller engaging with the under surface of the cradle, and a retaining device connecting the roller end of the guide yoke with the frame of the machine, whereby the movement of the guide yoke is limited, substantially as and for the purpose specified.

5. In a corn harvester, the combination, with the harvester platform, of the pivoted platform or cradle adapted to receive the cut stalks of corn and provided with a shaping strip or strap attached thereto, serving as a guide for the discharged shock when the cradle is dumped, and a pivoted guide yoke controlled by the cradle and adapted to hold the shock in an upright position after the shock is dumped, as and for the purpose set forth.

CHARLES A. LOW.
HAROLD A. LOW.
ALBERT M. MESSENGER.

Witnesses:
J. P. MULLEN,
IDA M. LUDWICK.